US008995481B2

(12) United States Patent
Achtenhagen et al.

(10) Patent No.: US 8,995,481 B2
(45) Date of Patent: Mar. 31, 2015

(54) LIGHT GENERATING SYSTEM AND METHOD

(71) Applicant: Photodigm, Inc., Richardson, TX (US)

(72) Inventors: Martin Achtenhagen, Plano, TX (US); John Edward Spencer, Plano, TX (US)

(73) Assignee: Photodigm, Inc., Richardson, TX (US)

( * ) Notice: Subject to any disclaimer, the term of this patent is extended or adjusted under 35 U.S.C. 154(b) by 0 days.

(21) Appl. No.: 14/179,267

(22) Filed: Feb. 12, 2014

(65) Prior Publication Data

US 2014/0160555 A1    Jun. 12, 2014

Related U.S. Application Data

(60) Division of application No. 13/272,277, filed on Oct. 13, 2011, now Pat. No. 8,693,513, which is a continuation of application No. PCT/US2010/030912, filed on Apr. 13, 2010.

(60) Provisional application No. 61/168,853, filed on Apr. 13, 2009.

(51) Int. Cl.
*H01S 3/10* (2006.01)
*G02F 1/29* (2006.01)
*H01S 3/23* (2006.01)
*H04N 9/31* (2006.01)
*H01S 3/00* (2006.01)

(52) U.S. Cl.
CPC . *G02F 1/29* (2013.01); *H01S 3/005* (2013.01); *H01S 3/0092* (2013.01); *H01S 3/2383* (2013.01); *H01S 3/2391* (2013.01); *H04N 9/3129* (2013.01); *H04N 9/3161* (2013.01)

USPC .............. 372/23; 372/69; 372/70; 372/81

(58) Field of Classification Search
CPC ....... H01S 3/00; H01S 3/0085; H01S 3/0092; H01S 3/09; H01S 3/0933; H01S 3/10; H01S 3/109
USPC ............................................. 372/23, 69, 70
See application file for complete search history.

(56) References Cited

U.S. PATENT DOCUMENTS

| 6,340,806 | B1 | 1/2002 | Smart et al. |
| 6,549,547 | B2 | 4/2003 | Galvanauskas et al. |
| 6,795,455 | B2 | 9/2004 | Scheps |
| 6,895,138 | B2 | 5/2005 | Toda et al. |
| 7,280,567 | B2 | 10/2007 | Luo et al. |
| 7,408,963 | B2 * | 8/2008 | Hayashi et al. ............ 372/21 |

(Continued)

OTHER PUBLICATIONS

Richter, A., et al., "Power scaling of semiconductor laser pumped Praseodymium-lasers," Optics Express, Apr. 16, 2007, vol. 15, No. 8, pp. 5172-5178.

(Continued)

*Primary Examiner* — Dung Nguyen
(74) *Attorney, Agent, or Firm* — Slater & Matsil, L.L.P.

(57) ABSTRACT

An optical system includes an electrically pumped laser light source and an optically pumped laser light source. An optical switch is located in a light path of the electrically pumped laser light source such that when the optical switch is in a first position light from the electrically pumped laser light source is directed toward the optically pumped laser light source and when the optical switch is in a second position light from the electrically pumped laser light source is directed away from the optically pumped laser light source.

21 Claims, 10 Drawing Sheets

(56) References Cited

U.S. PATENT DOCUMENTS

| | | |
|---|---|---|
| 8,098,414 B2 | 1/2012 | Nojima |
| 2010/0220294 A1 | 9/2010 | Mizuuchi et al. |
| 2011/0141150 A1* | 6/2011 | Hajjar et al. .................. 345/690 |

OTHER PUBLICATIONS

Sokólska, I., et al., "Investigation of high-energetic transitions in some Pr3+-doped fluoride and oxide crystals," Intl. Conference on Solid State Crystals 2000: Growth, Characterization, and Applications of Single Crystals, Rogaski, A., et al., Editors, Proceedings of SPIE vol. 4412, 2001, pp. 236-241.

Whitley, T. J., et al., "Upconversion Pumped Green Lasing in Erbium Doped Fluorozirconate Fibre," Electronics Letters, vol. 27, No. 20, Sep. 26, 1991, pp. 1785-1786.

* cited by examiner

LIGHT GENERATING SYSTEM AND METHOD

This is a divisional application of U.S. application Ser. No. 13/272,277, entitled "Light Generating System and Method," filed on Oct. 13, 2011 which is a continuation of International Application No. PCT/US2010/030912, filed Apr. 13, 2010, which designated the United States and which claims the benefit of U.S. Provisional Application No. 61/168,853, entitled "Light Generating System and Method," filed on Apr. 13, 2009, all of which are incorporated herein by reference.

TECHNICAL FIELD

The present invention relates generally to a laser system and, in particular embodiments, to a multicolor wavelength light system, e.g., where light of one wavelength can be used to generate light of another wavelength.

BACKGROUND

A laser is an optical source that emits photons in a coherent beam. Laser light is typically a single wavelength or color, and emitted in a narrow beam. Many materials have been found to have required characteristics to form the laser gain medium needed to power a laser, and these have led to innovations of many types of lasers with different characteristics suitable for different applications.

A semiconductor laser is a laser in which the active medium is a semiconductor. A common type of semiconductor laser is formed from a p-n junction, a region where p-type and n-type semiconductors meet. The semiconductor laser is powered by injecting electrical current into the gain region.

The gain region is surrounded by an optical cavity. An optical cavity is an arrangement of minors, or reflectors that form a standing wave cavity resonator for light waves. Optical cavities surround the gain region and provide feedback of the laser light.

SUMMARY OF THE INVENTION

The illustrated embodiments provide an apparatus, a system, and a method to generate red green blue (RGB) or any white laser light. The present invention may also relate to light sources and generated light providing wavelengths from far infrared (IR) to ultra violet (UV).

Aspects of the invention provide an efficient method for producing laser light at single or multiple simultaneous wavelengths, which might serve in applications including the compact light engine of a red-green-blue (RGB) module to be incorporated into an image projector.

In accordance a preferred embodiment, a method for generating laser light of sequentially differing wavelengths is disclosed. Laser light of a first wavelength is generated from an electrically pumped source. At a first time, the laser light is directed in a first direction, and, at a second time, the laser light is directed in a second direction toward an optically pumped laser source. The laser light directed in the second direction is used to generate laser light with a second wavelength at the optically pumped laser source.

In accordance with another preferred embodiment of the present invention, an optical system includes an electrically pumped laser light source and an optically pumped laser light source. The optical system further includes a micro-electro-mechanical system (MEMS) switch located in a light path of the electrically pumped laser light source such that when the optical switch is in a first position, light from the electrically pumped laser light source is directed toward the optically pumped laser light source, and when the optical switch is in a second position, light from the electrically pumped laser light source is directed away from the optically pumped laser light source.

In accordance with another preferred embodiment of the present invention, a light engine includes a blue laser source, a green laser source comprising an optically pumped solid state laser and a red laser source. The engine further includes an optical switch in an optical path between the blue laser source and the green laser source, wherein, when the optical switch is in a first position, light from the blue laser source is directed toward the optically pumped solid state laser and, when the optical switch is in a second position, light from the blue laser source is directed toward an optical output. Furthermore, the light engine includes an optical device in an optical path of the red laser source, the optical device directing light from the red laser source toward the optical output.

In accordance with yet another preferred embodiment of the present invention, an optical system includes a first infrared laser light source and a second infrared laser light source. A first optical component generates visible light of a first color from light from the first and second infrared laser light sources, a second optical component generates visible light of a second color from light from the first and second infrared laser light sources, and a third optical component generates visible light of a third color from light from the first and second infrared laser light sources. An optical switch is coupled between the first and second infrared laser light sources and the first, second and third optical components to sequentially direct light from the first and second infrared laser light sources toward the first, second and third optical components.

Other embodiments and refinements of the above-discussed embodiments are also disclosed herein.

BRIEF DESCRIPTION OF THE DRAWINGS

For a more complete understanding of the present invention, and the advantages thereof, reference is now made to the following descriptions taken in conjunction with the accompanying drawing, in which:

FIG. 7, which includes

DETAILED DESCRIPTION OF ILLUSTRATIVE EMBODIMENTS

Figure 1:
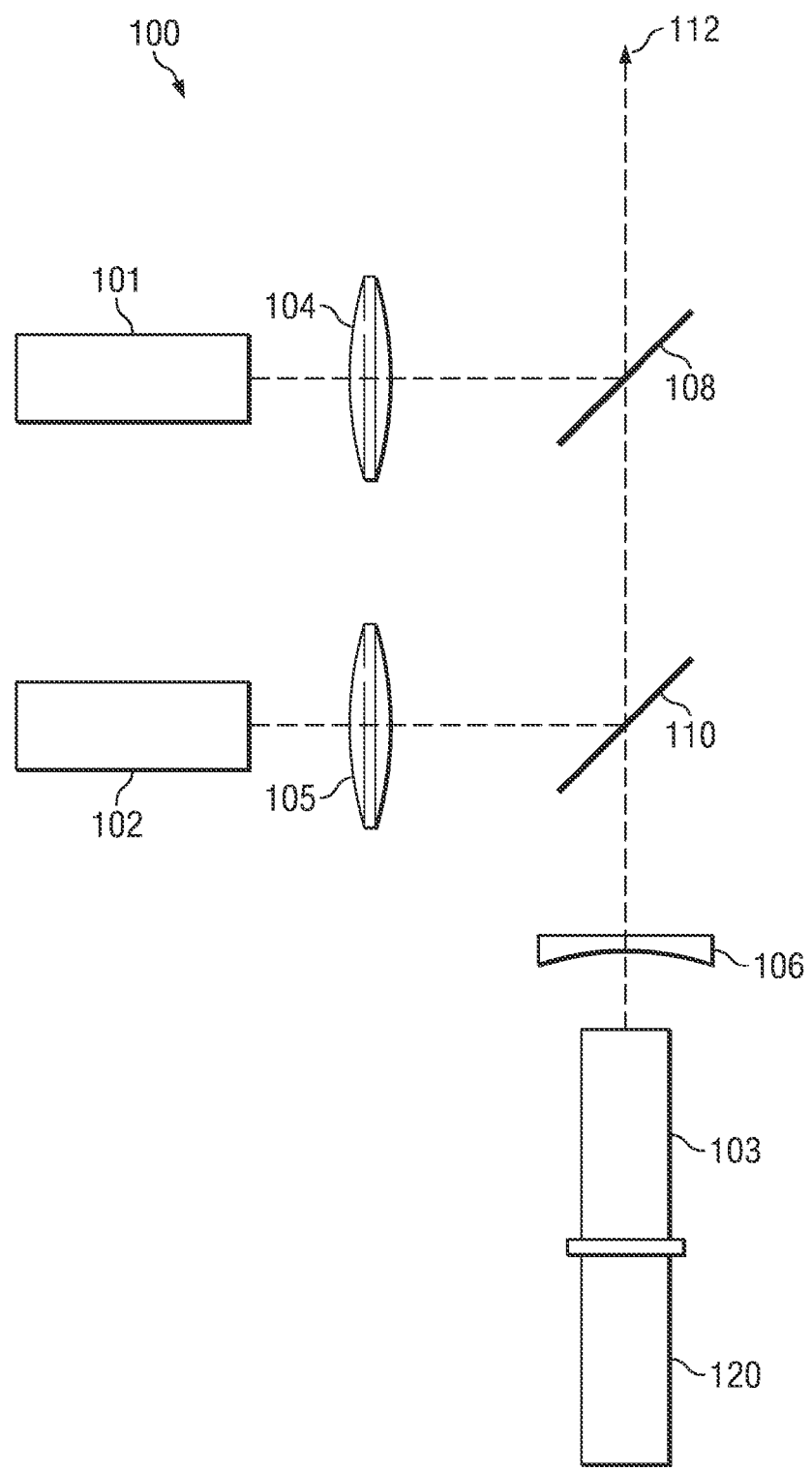
FIG. 1 is an architecture of an optical system comprising three semiconductor lasers.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely an optical system with novel architectures of semiconductor lasers to efficiently generate multi-colored light, e.g., red green blue (RGB) or white light. The invention may also be applied, however, to other optical systems with lasers and light sources other than semiconductor lasers. Further, the invention still may also be applied to light sources providing wavelength from far infrared (IR) to ultra violet (UV).

As will be discussed in more detail below, the present invention discloses a number of novel architectures to generate efficient RGB light in a module. For example, a first architecture uses two semiconductor lasers emitting in the red and blue. The green light is generated by optically pumping a solid state laser. The solid state laser may be, but is not limited to, a Praseodymium ion-doped host material, which may be YLF, glass, crystal, polymer, ceramic, or other adequate host material. The solid state laser is directly pumped by a semiconductor pump source.

A second architecture uses two semiconductor lasers emitting in the red and blue. The green light is generated by optically pumping a solid state laser. The solid state laser may comprise, but not limited to, a Pr doped crystal/material, which may be YLF or glass or other adequate host materials. The solid state laser is directly pumped by the blue light source, whereas the beam can be re-directed via a mirror, e.g., a MEMS mirror, that is transparent to green and reflects blue. By this the blue light source is used either as a pump source to generate green or directed to the output of the module.

A third architecture uses only one semiconductor laser, e.g., blue and the beam can be re-directed either in the direction to serve as a pump for the green DPSS or red DPSS or directly to the output of the module. Again, the visible DPSS maybe constructed in a similar way as in the first and second architectures. An additional mirror, one that is transparent to red and reflects blue and green, is used. Each of these embodiments will be discussed in more detail below.

The optical system may be arranged in a stand alone system or module. In fact, the optical system may be arranged in any desired way.

In one embodiment, semiconductor lasers may serve as pump sources to excite dopant ion species in a host material to an elevated energy level and thus allowing spontaneous or stimulated photo emission at one or more wavelengths. These wavelengths correspond to transitions from the elevated energy level to one of the discrete lower energy levels characteristic to the specific dopant ion species.

The semiconductor pump source may employ a shorter wavelength (higher photon energy) than the wavelength emitted from the solid state laser to directly elevate the dopant ion to the desired high energy state with a single photon. This results in a single photon down-conversion between the pump and the emitted laser wavelength.

Alternatively, the semiconductor pump source may employ two or more longer wavelengths each with lower photon energy than the desired wavelength emitted from the solid state laser, thus indirectly elevating the dopant ion in multiple intermediate steps to the desired high energy state through multiple photon absorption. This results in a multi-photon up-conversion between the pump and the emitted laser wavelength.

For either method of optical pumping, the net result is that an ion is elevated to a specific higher energy level that corresponds to the desired laser output wavelength when the ion transitions to a lower energy level either through spontaneous or through stimulated emission.

The embodiment has the advantage that the ion transition from the higher to lower energy level may produce the final output wavelength needed for the application. The stimulated emission has further the advantage to eliminate the need for additional wavelength conversion, for instance, by second harmonic generation to obtain the needed final wavelength.

With reference now to FIG. 1, a first architecture of an optical system 100 to generate an efficient RGB light is shown. The optical system 100 includes a first semiconductor laser 101, a second semiconductor laser 102, and a laser 103. The first semiconductor laser 101 may typically be a conventional diode laser but any other semiconductor laser such as a vertical cavity surface emitting laser (VCSEL) or vertical-external cavity surface emitting laser (VECSEL) may be suitable. The first semiconductor laser 101 may comprise GaAs, $AlGa_xGa_{(1-x)}As$ or any other suitable material. The first semiconductor laser 101 may comprise a distributed Bragg reflector (DBR) laser, distributed feedback (DFB) lasers, Fabry Perot lasers, fiber Bragg grating lasers, or volume Bragg lasers. The first semiconductor laser 101 may emit red light or blue light. Alternatively, laser 101 may emit light of any other color including UV and far IR.

The second semiconductor laser 102 may typically be a conventional diode laser but any other semiconductor laser such as a vertical cavity surface emitting laser (VCSEL) or vertical-external cavity surface emitting laser (VECSEL) may be suitable. The second semiconductor laser 102 may comprise GaAs, $Al_xGa_{(1-x)}As$ or any other suitable material. The second semiconductor laser 102 may comprise a distributed Bragg reflector (DBR) laser, distributed feedback (DFB) lasers, Fabry Perot lasers, fiber Bragg grating lasers, or volume Bragg lasers. The second semiconductor laser 102 may emit red light or blue light. Alternatively, semiconductor laser 102 may emit light of any other color including UV and far IR. Semiconductor laser 102 is configured to emit a different light than semiconductor laser 101. For example, if semiconductor laser 102 emits blue light semiconductor laser 101 emits red light.

Laser 103 may be an optically pumped solid state laser or an infrared laser. However, any other laser may be suitable. Laser 103 may emit green light. Alternatively, laser 103 may emit light of any other color. Laser 103 is configured to emit a different light than semiconductor laser 101 and/or semiconductor laser 102. For example, if laser 103 emits green light semiconductor laser 101 emits red light and semiconductor laser 102 emits blue light.

The laser 103 may be an optically pumped solid state laser, e.g. a crystal laser. The gain medium of the solid state laser may comprise, but is not limited to, a praseodymium ion-doped host material, which may be yttrium lithium fluoride (YLF), glass, crystal, polymer, ceramic or other adequate host materials.

In one embodiment, the solid state laser 103 may be pumped by a semiconductor laser 120. The semiconductor laser 120 may be directly attached to the solid state laser 103. The semiconductor laser 120 may comprise the same types and materials as the semiconductor lasers 102 and 103 and may emit preferably blue light.

Figure 2A:
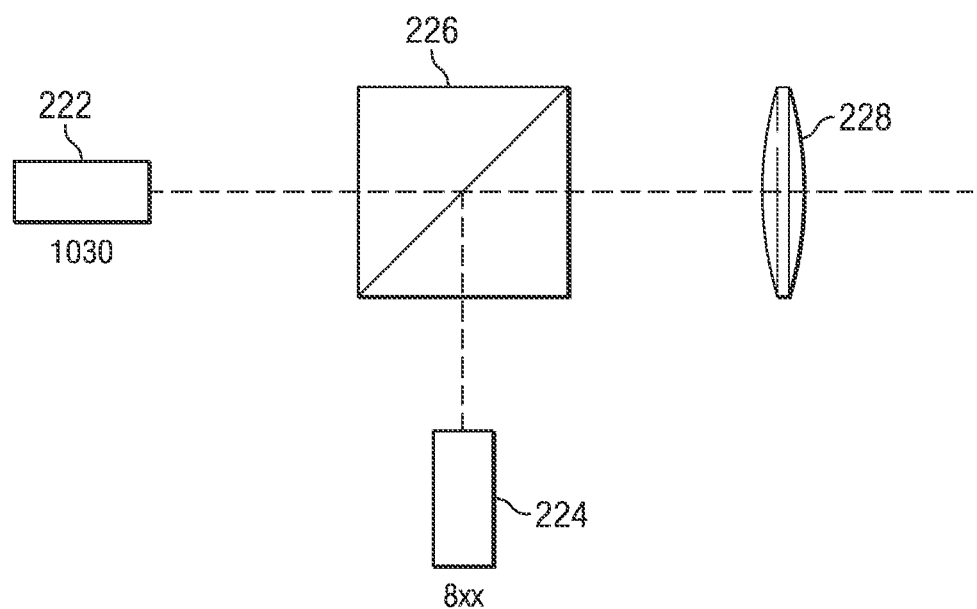
FIG. 2a describes how light from two infrared laser sources can be combined to do two-photon up-conversion.
Figure 2B:
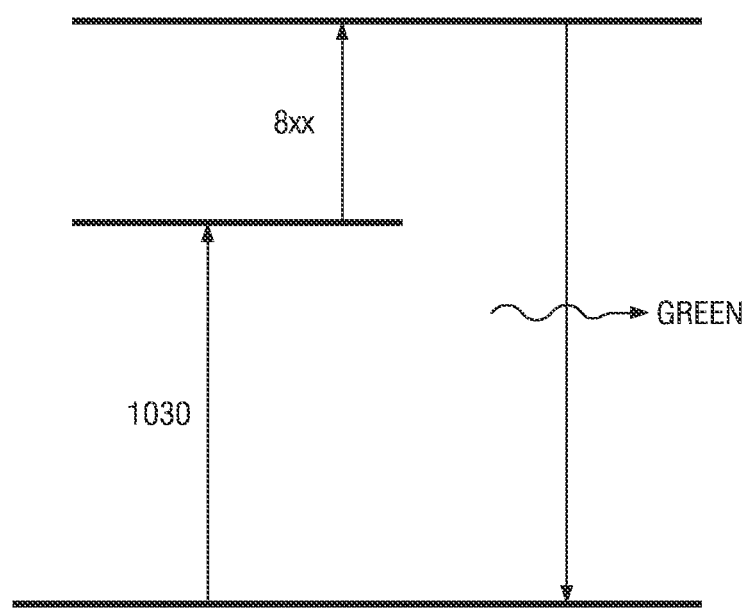
FIG. 2b is an energy level diagram showing how two infrared photons can be used to pump an excited state, when can then emit green laser light.

In another embodiment, the laser 120 may be an infrared laser. FIG. 2a shows an arrangement that includes a first infrared laser 222 and a second infrared laser 224. Light from each of these lasers is combined in optical component 226, which transmits light from laser 222 and reflects light from laser 224 toward lens 228. FIG. 2*b* shows an energy level diagram showing how two infrared photons can be used to pump an excited state, when can then emit green laser light. As will be discussed below, other colors could be generated from the lasers.

Returning to FIG. 1, the optical system 100 further comprises focusing lenses 104, 105 which focus the emitted light beams. An output coupler 106 may be placed in the output light beam of the solid state laser 103. The output coupler 106 may reflect the light or energy that is not absorbed by the solid state laser 103 in order to increase optical efficiency.

The optical system 100 also includes minors 108 and 110. For example, the minor 108 may reflect the focused red light of laser 101 towards the output 112 and, similarly, the minor 110 may reflect the focused blue light of laser 102 towards the output 112. Minor 108 is transparent for the green light emitted by laser 103 and the blue light emitted by laser 102 so that the green and blue light can propagate towards output 112. Similarly, mirror 110 is transparent for the green light emitted by laser 103.

Figure 3:
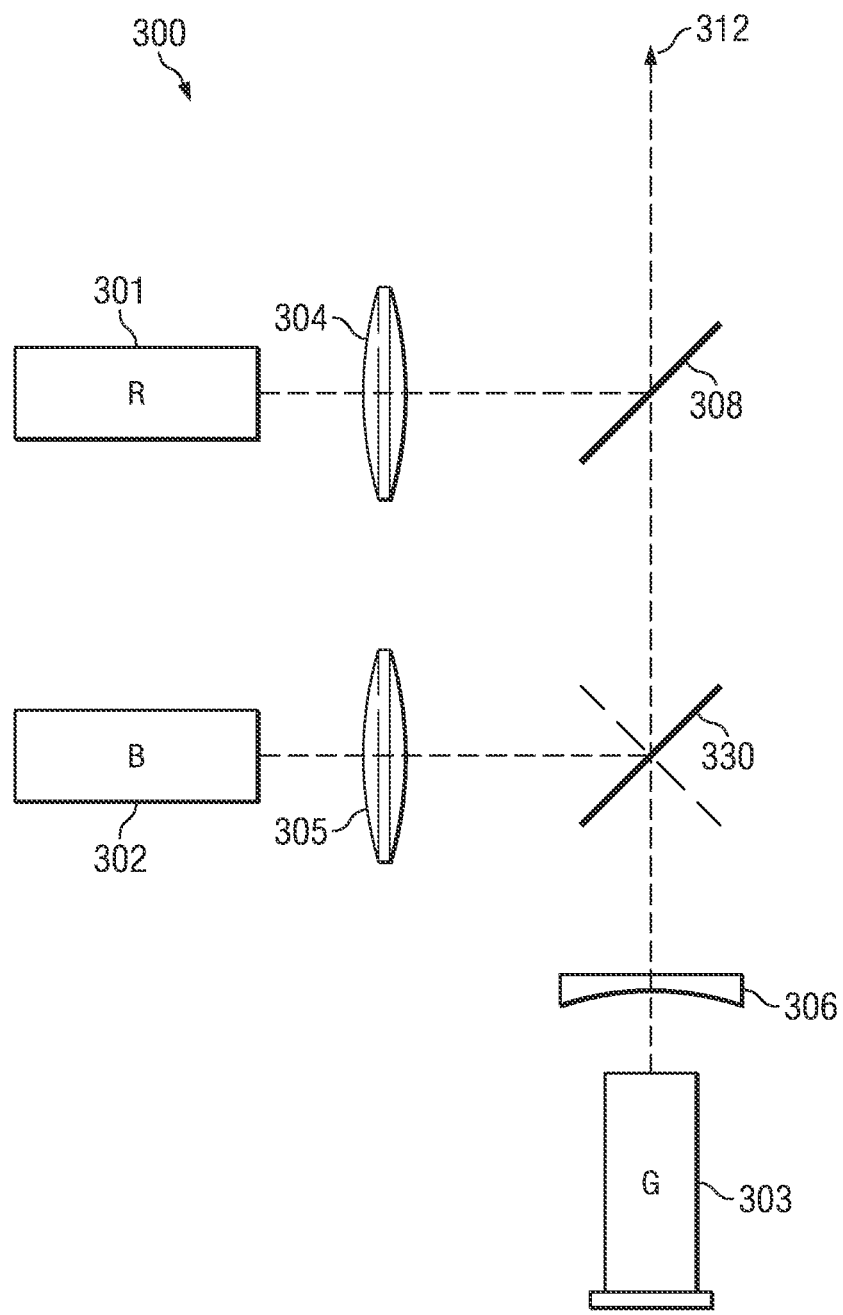
FIG. 3 is an architecture of an optical system comprising two semiconductor lasers.

FIG. 3 shows an embodiment of an optical system 300. In this embodiment similar numerals will be used for similar elements of previous embodiments. The optical system 300 comprises a first semiconductor laser 301, a second semiconductor laser 302 and a solid state laser 303. The first laser 301, the second laser 302 and the solid state laser 303 may comprise similar types of and similar materials as disclosed with respect to the arrangement disclosed in FIG. 1. In this figure, along with later figures, the lasers are labeled with R, G and B only to simplify the understanding of operation. It must be understood that the lasers can be interchanged and other, more or fewer colors can be used.

The optical system 300 further comprises focusing lenses 304, 305 which focus the emitted light beams. An output coupler 306 may be placed in the output light beam of the solid state laser 303. The output coupler 306 may reflect the light or energy that is not absorbed by the solid state laser 303 in order to increase optical efficiency.

Figure 9:
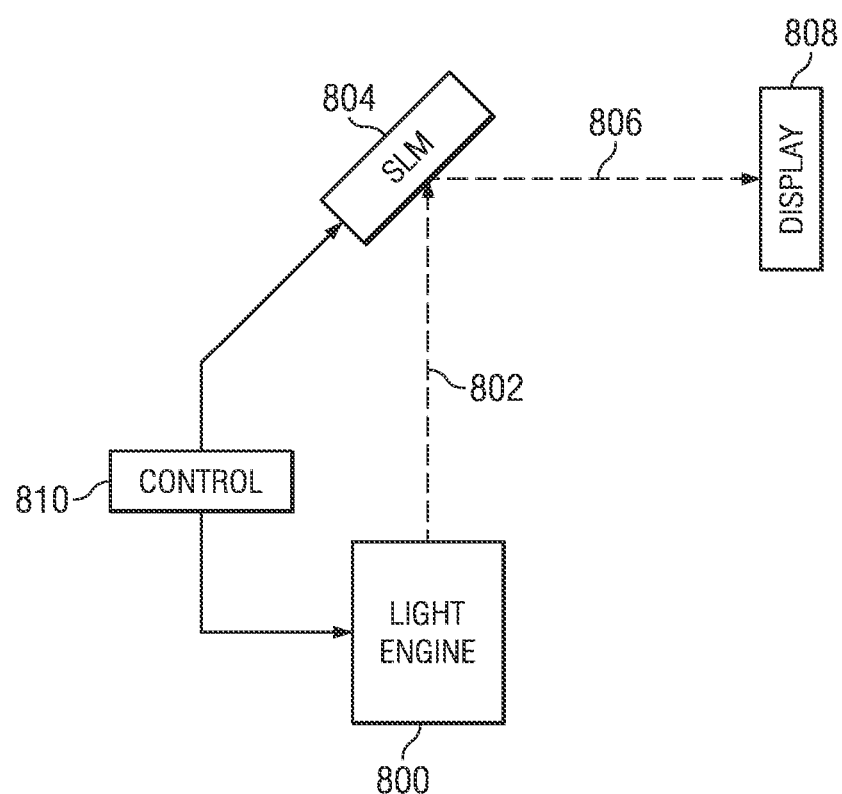
FIG. 9 is an optical diagram of a projector application.

Optical switch element 330 may be a movable wavelength selective element or optical mirrors. As one example, the optical switch element 330 can be a MEMS minor. The optical switch element 330 may direct the focused beam of semiconductor laser 302 towards the solid state laser 303 or towards an output 312. In other words, the position of a minor of a optical switch element 330 can be switched. The optical switch element 330 may be controlled by a controller (not shown; see, e.g., FIG. 9).

If the optical switch element 330 directs the focused beam of semiconductor laser 302 towards the solid state laser 303 and the solid state laser 303 may produce green light. Accordingly, the optical switch element 330 and the mirror 308 are transparent for green light so that the green light, when emitted, can propagate towards the output 312.

The green light is generated by optically pumping the solid state laser 303. The solid state laser 303 is directly pumped by the second semiconductor laser or the blue light source 302, where the beam can be redirected via the optical switch element 330 that is transparent to green light and reflective to blue and possibly red light. With such an arrangement the second semiconductor laser 302 is used either as a pump source to generate green light with solid state laser 303 or as a blue light source directed to the output 312 of the optical system 300.

Figure 4:
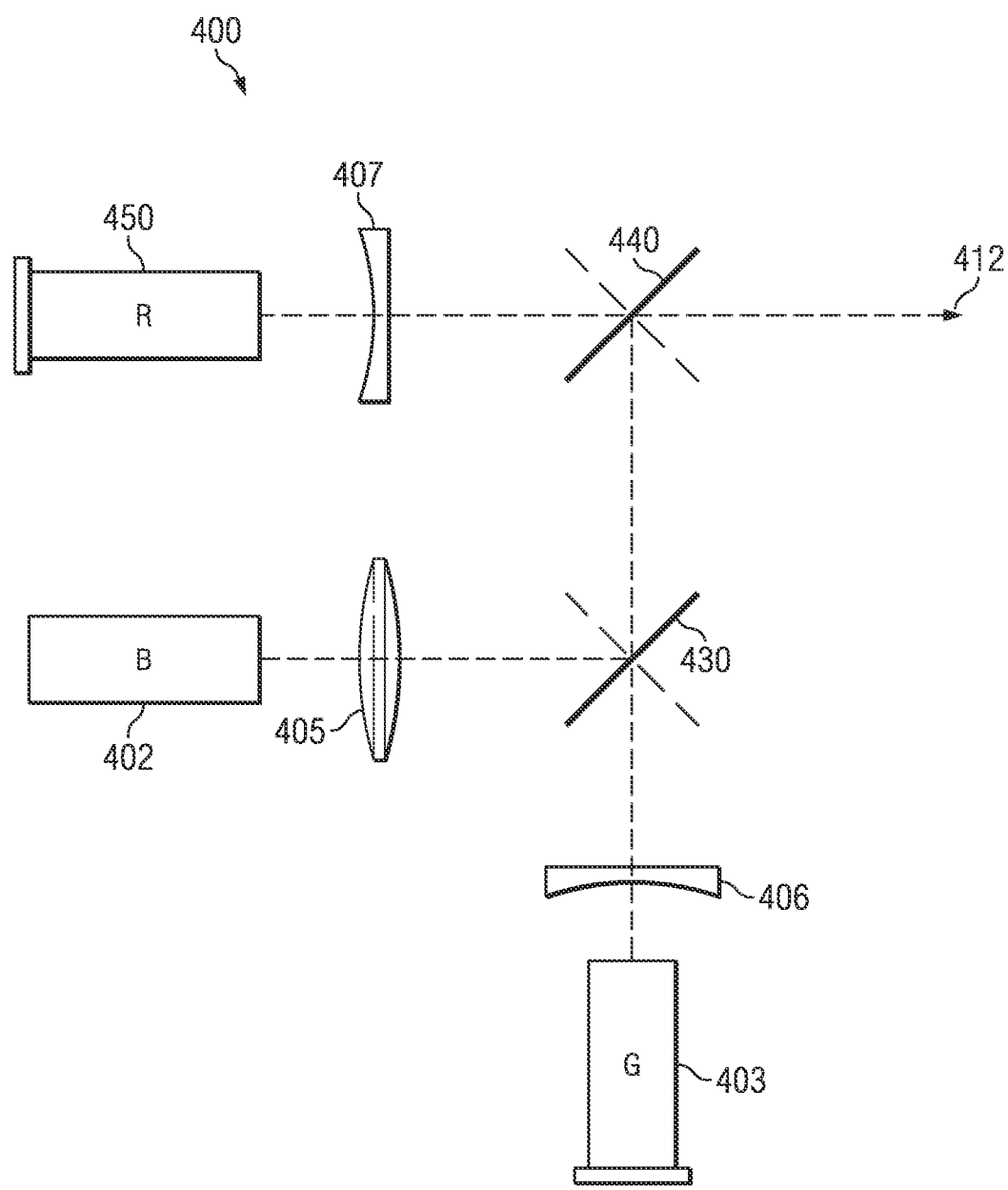
FIG. 4 is an architecture of an optical system comprising one semiconductor laser.

FIG. 4 shows another embodiment of an optical system 400. Once again, similar numerals will be used for similar elements of previous embodiments. The optical system 400 comprises a semiconductor laser 402, a first solid state laser 450 and a second solid state laser 403. The semiconductor laser 402, the first solid state laser 450 and the second solid state laser 403 may comprise similar types of and materials as disclosed with respect to the arrangement disclosed in FIG. 1. However, solid state laser 450 may comprise a different material than solid state laser 403. FIG. 4 shows only one semiconductor laser 402, which may emit a blue laser light. The beam of semiconductor laser 402 can be redirected either in the direction to serve as pump for the green solid state laser 403 or the red solid state laser 450. The beam can also be directed directly to the output 412.

The optical system 400 further comprises a focusing lens 405 which focuses the emitted light beams. Output couplers 406, 407 may be placed in the output light beam of the solid state lasers 403, 450. The output couplers 406, 407 may reflect the light or energy that is not absorbed by the solid state lasers 403, 450 in order to increase optical efficiency.

Optical switch elements 430, 440 may be MEMS mirrors or other types of micro-electronic actuators. The optical switch element 430 may direct the focused beam of semiconductor laser 402 towards the second solid state laser 403. The optical switch element 430 may be transparent for the focused green light of solid second state laser 403 and reflective for the focused blue light of the semiconductor laser 402.

The optical switch elements 430, 440 may direct the focused beam of semiconductor laser 402 towards the first solid state laser 450. The optical switch element 440 may be reflective for the focused blue light of the semiconductor laser 402. The optical switch element 440 may also be reflective for the focused green light of the second solid state laser 403 and transparent for the focused red light of the first solid state laser 450. The optical switch element 430 may be different from the optical switch element 440. In other words, the positions of the minor of the optical switch elements 430, 440 may be switched. The optical switch elements 430, 440 may be controlled by a controller (not shown).

Red light is generated by optically pumping the first solid state laser 450. Green light is generated by optically pumping the second solid state laser 403. The solid state lasers 403, 450 may be directly pumped by the semiconductor laser or the blue light source 402. The beam of the semiconductor laser can be redirected via optical switch elements 430, 440 either to the first solid state laser 450 or the second solid state laser 403. With such an arrangement the semiconductor laser 402 can be used either as a pump source to generate green and red light with solid state lasers 403, 450 or as a blue light source directed to the output 412 of the optical system 400.

Figure 5:
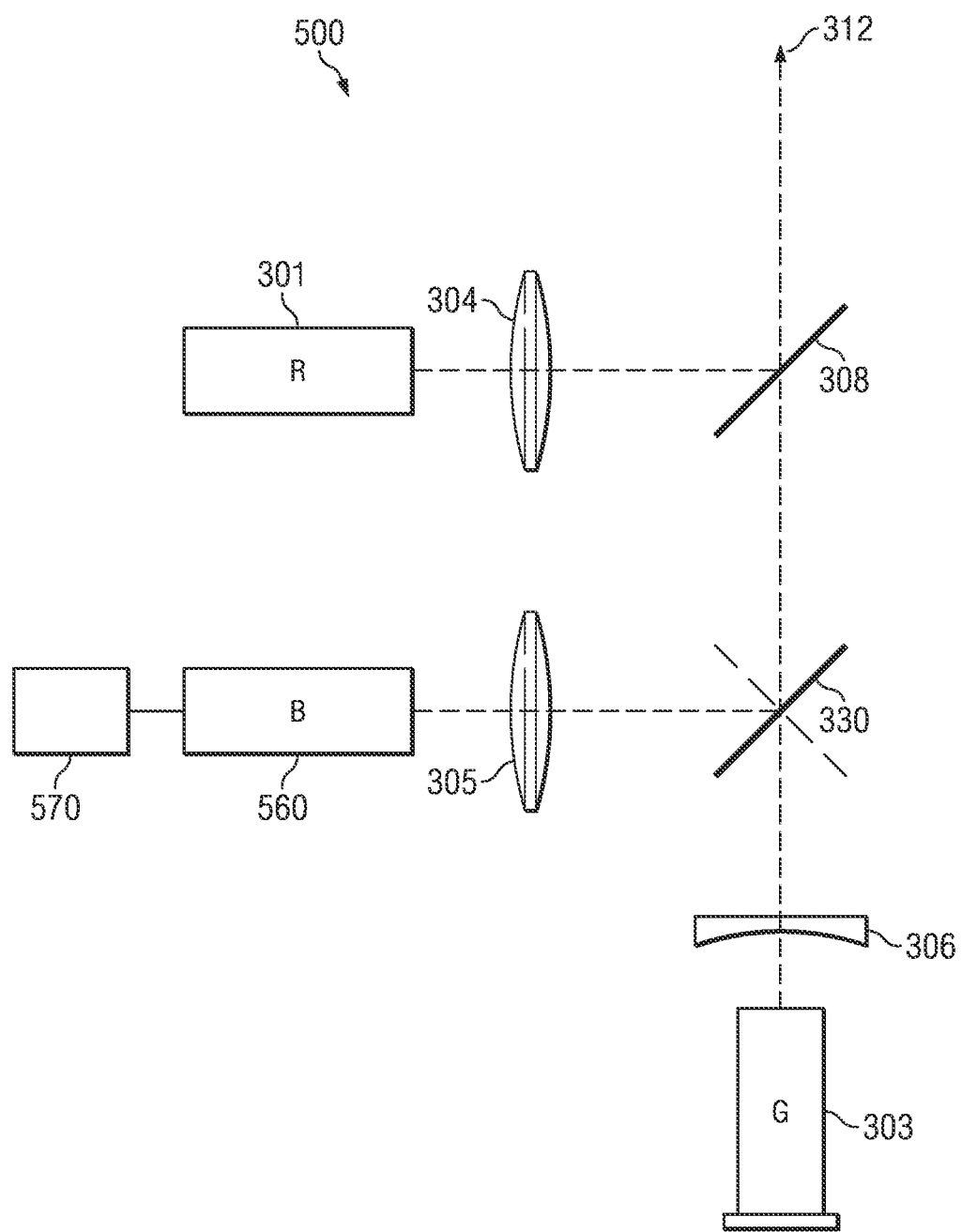
FIG. 5 is another embodiment architecture of an optical system comprising two semiconductor lasers.
Figure 6:
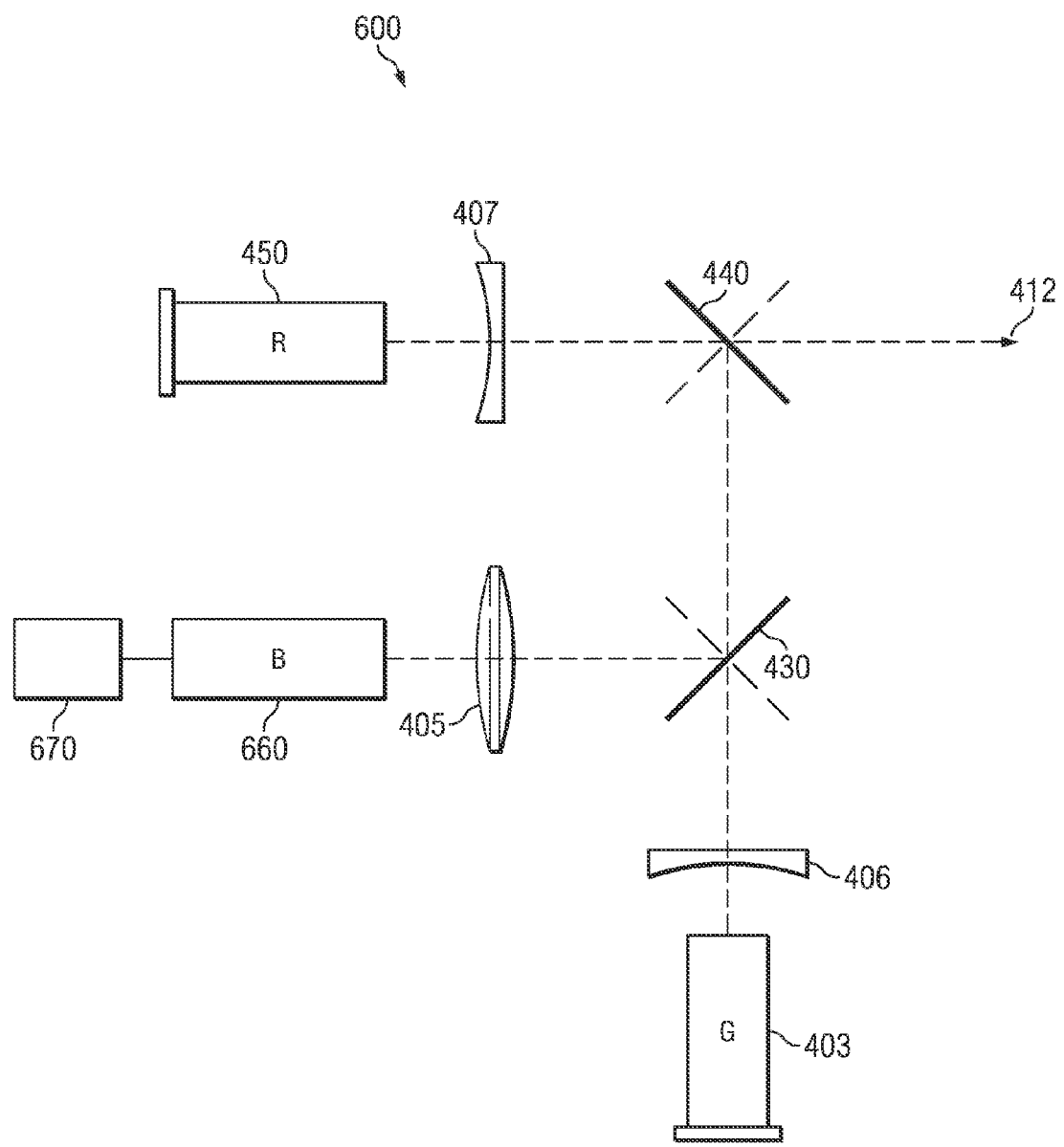
FIG. 6 is another embodiment architecture of an optical system comprising one semiconductor laser.

FIGS. 5 and 6, which resemble FIG. 3 and FIG. 4, respectively, show that blue source can optically generated. In these embodiments similar numerals are used for similar elements of previous embodiments. However, FIGS. 5, 6 show optical systems using high power semiconductor lasers, e.g. lasers with an output of more than 7 Watts.

FIG. 5 shows an optical system 500 comprising two high power semiconductor lasers, i.e., a first semiconductor laser 301 and a second semiconductor laser 560, 570. The first semiconductor laser 301 may provide a red high power laser beam and the second semiconductor laser 560, 570 may provide a blue high power laser beam. The second semiconductor laser 560, 570 may comprise a semiconductor laser 570 emitting light within the infra red spectrum or, in a particular example, within the spectrum of 9xx nm. The emitted light of the semiconductor laser 570 is converted by the optical converter 560 using second harmonic generation (SHG) or frequency doubling. The optical converter 560 may convert the incoming beam by a non-linear optical process, in which photons interacting with a nonlinear material are effectively "combined" to form new photons with twice the energy, i.e. twice the frequency but half the wavelength of the initial photons. The red laser beam can be either produced directly from a semiconductor, or it can be produced from an infrared laser and converted to red through second harmonic generation using a non-linear optical crystal, such as periodically poled lithium niobate (PPLN).

FIG. 6 shows an optical system 600 wherein the high power semiconductor laser 660, 670 resembles the features of high power semiconductor laser 560, 570. However, FIG. 6 shows an optical system 600 wherein only one high power semiconductor light source 660, 670 is used in order to provide RGB or white light. RGB or white light is provided by "redirecting beams" of the high power semiconductor light source 660, 670 using solid state lasers 403, 450.

Figure 7A:
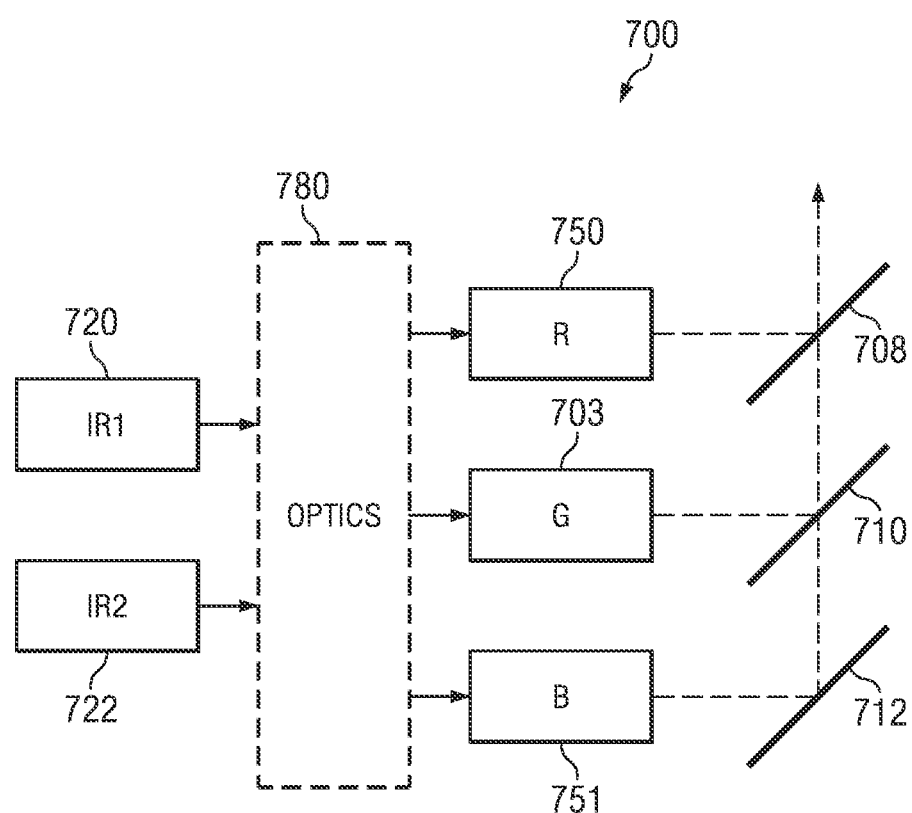
FIGS. 7a and 7b, is an architecture showing pumping optical materials with two infrared lasers.

FIG. 7a shows an optical system 700 where each of the visible light producing lasers 703, 750 and 751 are optically pumped lasers that are excited by infrared lasers 720 and 722. For example, IR1 and IR2 together can be considered a "blue equivalent" in that the sum of the reciprocals of their photon energies is equal to the reciprocal of the photon energy of the blue photon.

In one example, the optical component 750 generates light of a first color, e.g., red, from light from the infrared laser light sources 720 and 722, the optical component 703 generates light of a second color, e.g., green, from light from the infrared laser light sources 720 and 722, and the optical component 751 generates light of a third color, e.g., blue, from light from the infrared laser light sources 720 and 722. While RGB components are discussed, it is understood that other colors and a different number of colors could alternatively be produced. (This same caveat applies to all of the embodiments described herein.)

An optical switch 780 is coupled between the first and second infrared laser light sources 720 and 722 and the first, second and third optical components 703, 750 and 751 to sequentially direct light from the infrared laser light sources toward the optical components. For example, the configuration of FIG. 2a could be used to generate a light source with multiple wavelengths that could be directed to one or more of the other optical components. For example, the architecture of FIG. 6 could be used where the infrared light generates one of the visible wavelengths, which is in turn used to generate the other wavelengths.

Figure 7B:
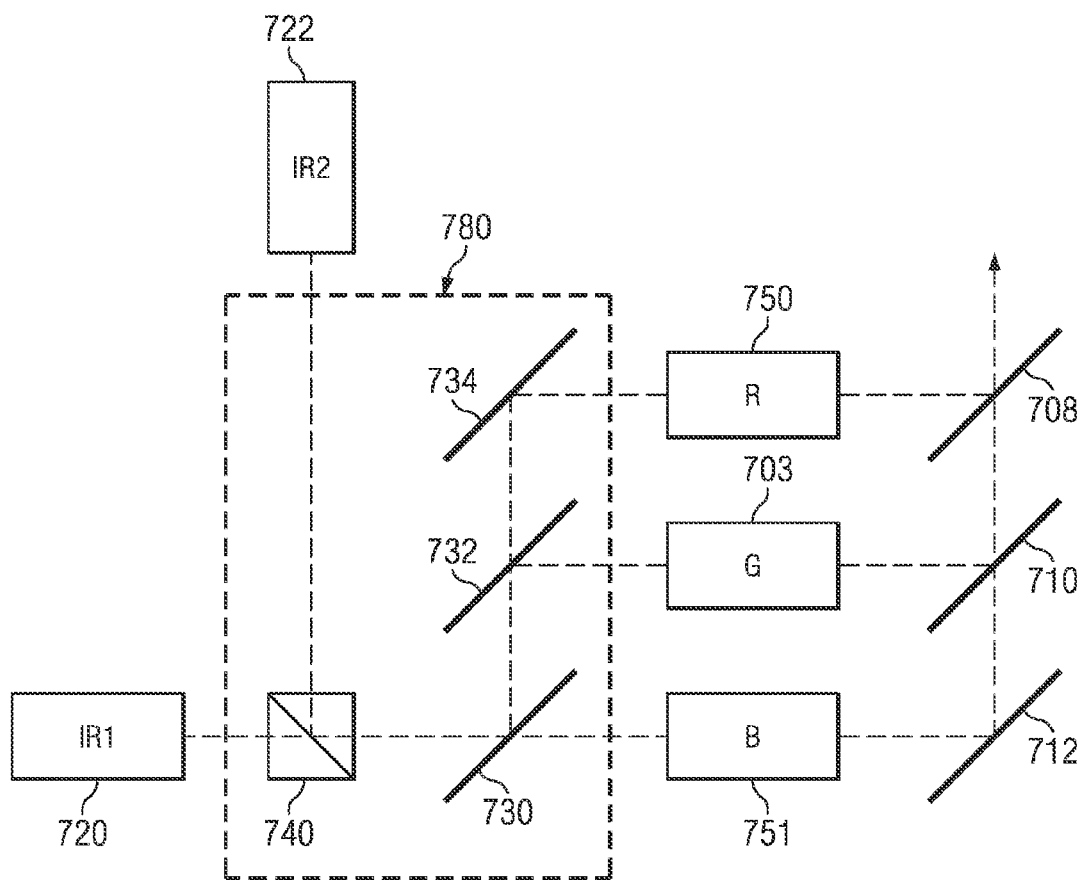

FIG. 7b shows one particular embodiment of the architecture of FIG. 7a. In this example, the optical switch 780 includes a beam combiner 740 and three optical elements 730, 732 and 734. During operation, the light from the IR laser light sources 720 and 722 are directed toward the beam combiner 740, from which they are combined and directed toward optical element 730. The optical element 730 will be configured to either transmit the combined light wave toward the blue laser 751 or reflect the combined light toward optical switch element 732. For example, the optical element 730 can be an optical switch, e.g., a MEMS device, that is reflective when impinged upon at one surface and transmissive when impinged upon a second surface.

The light that is directed down the laser light source 751 will be used to optically pump the source 751 to generate light that can be output to minor 712. The light reflected toward optical element 732 will be either redirected to laser light source 703 or transmitted to optical element 734. The configuration of the optical element 734 can be identical (in function and/or form) to that of optical element 730. The optical element 734 can be a mirror (since in the three color system there is no additional laser light source).

An advantage of the architecture of FIG. 7 is that relatively inexpensive semiconductor lasers can be used for the infrared sources 720 and 722. These relatively inexpensive light sources could then be used to generate light at a desired wavelengths without need for more expensive lasers.

Figure 8:
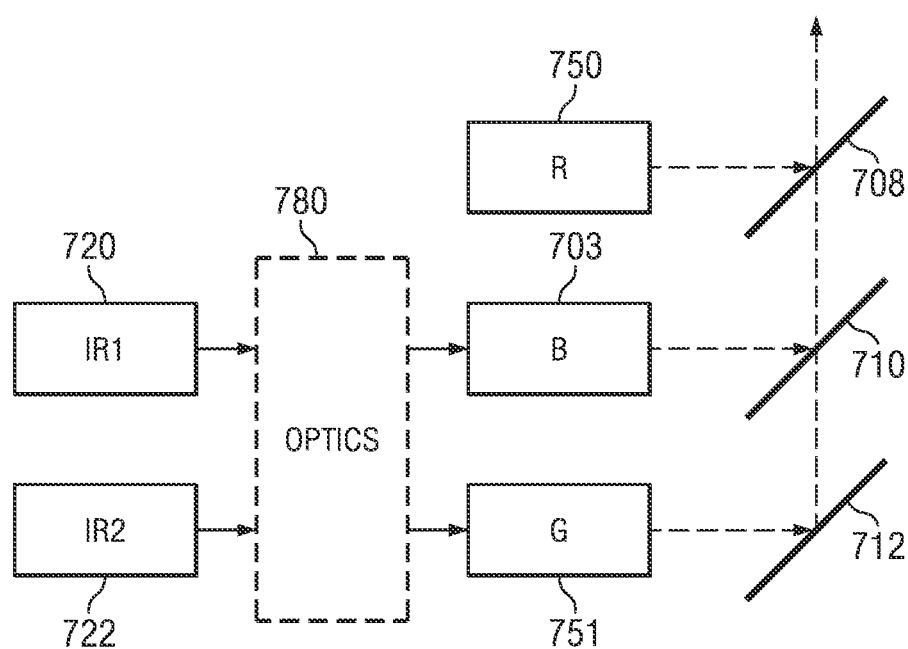
FIG. 8 is another embodiment architecture showing pumping optical materials with two infrared lasers.

FIG. 8 shows a further embodiment that similar to that of FIG. 7. In this example, two IR lasers 720 and 722 of different wavelengths alternately pump a green optically pumped laser 751 and a blue optically pumped laser 703. A red laser light source 755 is also included. Red lasers are sufficiently well developed so that this embodiment is a cost-effective alternative.

In the embodiments of FIGS. 7 and 8, there are a number of possibilities on how to implement the infrared lasers 720 and 722. In a first example, one laser is wavelength stabilized (which could be either distributed Bragg reflector, distributed feed back, fiber Bragg laser or volume Bragg grating, as examples) and the other is a free running (e.g., Fabry Perot) laser. In a second example, both lasers are wavelength stabilized. In a third example; both lasers are free running, but at least one of them should to be temperature stabilized to keep the wavelength from drifting.

In each of the previous architectures, the semiconductor pump source serves to excite the dopant ion species in the host material to an elevated energy level thus allowing spontaneous or stimulated photon emission at one or more wavelengths. These wavelengths correspond to transitions from the elevated energy level to one of the discrete lower energy levels characteristic to the specific dopant ion species.

The semiconductor pump source may employ a shorter wavelength (higher photon energy) than the wavelength emitted from the solid state laser to directly elevate the dopant ion to the desired high energy state with a single photon. This results in single photon down-conversion between the pump and emitted laser wavelength.

Alternately, the semiconductor pump source may employ two or more longer wavelengths each with lower photon energy than the desired wavelength emitted from the solid state laser, thus indirectly elevating the dopant ion in multiple intermediate steps to the desired high energy state through multiple photon absorption. This results in multi-photon up-conversion between the pump and emitted laser wavelength.

For either method of optical pumping, the net result is that an ion is elevated to a specific high energy level that corresponds to the desired laser output wavelength when the ion transitions to a lower energy level either through spontaneous or stimulated emission.

One advantage to either pumping method is that the ion transition from the higher to lower energy level produces the final output wavelength needed for the application directly from the solid-state laser, thus eliminating the need for additional wavelength conversion (for instance by second harmonic generation) to obtain the needed final output wavelength.

As one example, these architectures will enable compact and efficient RGB sources for handheld display units using direct laser output wavelengths thus bridging the "green gap" that describes the current lack of green semiconductor laser sources for display applications. These architectures also enable RGB laser output that could form white light from a common laser material.

The light engines described above can be used in a number of systems. One example will be described with respect to FIG. 9, which shows a simplified block diagram of a display system. For example, the system of FIG. 9 could be used for a pico projector since the light engine 800 can have a very small form factor.

The light engine 800 can be implemented with any of the embodiments described above. For example, the light engine can generate red, blue or green laser light sequentially or at the same time. Light generated by the light engine 800 is directed toward a spatial light modulator 804, where it is modulated and redirected toward display 808. For the sake of simplicity, optics such as mirrors and lenses are not included in the drawing.

Spatial light modulator can be either reflective (as shown) or transmissive (in which case the light 806 would be shown as be emitted from an opposite surface of the modulator). In one embodiment, the spatial light modulator is a digital minor device (DMD). In another embodiment, the spatial light modulator is a liquid crystal on silicon (LCOS) device. In a third embodiment, it is a holographic optical element (HOE).

A controller 810 is coupled to control both the light engine 800 and the spatial light modulator 804. The controller 810, which may include a digital signal processor for example, receives a video signal from a video source (not shown). The controller causes the light engine 800 to sequentially emit red, green and blue light while at the same time causing the spatial light modulator to reflect the desired pattern of the light toward the display 808. The frequency of the display of the colors is high enough so that the viewer integrates colors to see the desired picture.

The display 808 can be either transmissive (e.g., rear projection) or reflective (e.g., front projection). In one example, as noted above, the display 808 can be the display of a pico projector (pocket projector or hand-held projector). In other embodiments, the display can be a television or a projector.

A further application of the embodiments of the inventive optical system may be for a laser television. This embodiment can use a light engine as shown in FIGS. 5 and 6, for example, to generate the high power required for laser television. Any display configuration, e.g., as shown in FIG. 8, could be used with the light engine.

While the present invention has been described primarily with respect to the primary colors, it is understood that complementary colors could also be used. The actual colors will be application dependent and may include any color of light, including both visible and invisible light. For example, the invention could produce a hyperspectral source, for example, wherein the laser wavelengths ("colors") range from UV to far infrared. There could also be more than three colors (or only two colors). For example, a hyperspectral imaging system may require light from the UV to the mid or far IR to provide the discrimination required for certain applications. Such a system may use one UV laser, a red, a green, a blue, plus one in the near IR around 1000 microns, one at 3000 microns, and one at 7000 microns.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An optical system comprising:
a first semiconductor infrared laser light source;
a second semiconductor infrared laser light source;
a first optical component configured to generate visible light of a first color from infrared light;
a second optical component configured to generate visible light of a second color from the infrared light; and
an optical switch coupled between the first and second semiconductor infrared laser light sources and the first and second optical components.

2. The system of claim 1, further comprising a third optical component configured to generate visible light of a third color from the infrared light, the optical switch further being coupled between the first and second semiconductor infrared laser light sources and the third optical component.

3. The system of claim 1, further comprising a third optical component configured to generate electrical pumped laser light, and wherein the first color is blue, the second color is green and a third color is red.

4. The system of claim 1, wherein the first semiconductor infrared laser light source is a first type of laser light source and the second semiconductor infrared laser light source is a second type of laser light source, the second type being different than the first type.

5. The system of claim 1, wherein the first semiconductor infrared light source is configured to generate a first infrared light and wherein the second semiconductor infrared light source is configured to generate a second infrared light and wherein the infrared light is a combination of the first infrared light and the second infrared light.

6. An optical system comprising:
a first infrared laser light source;
a second infrared laser light source;
an optical switch optically connected to the first and second infrared laser light sources;
a first optical component configured to generate a first visible light;
a second optical component configured to generate a second visible light; and
a third optical component configured to generate a third visible light, where the first to third optical components are optically connected to the optical switch, wherein the first to third optical components are optically connected to an output, and wherein the optical switch comprises a first optical switch connected to the first optical component, a second optical switch connected to the second optical component, and a third optical switch connected to the third optical component.

7. The system of claim 6, wherein the optical switch comprises a beam combiner configured to combine the first infrared light and the second infrared light, wherein the beam combiner is optically connected to the first optical switch.

8. The system of claim 7, wherein the first to third optical switches are MEMS devices.

9. The system of claim 8, wherein the MEMS devices are the same MEMS devices.

10. The system of claim 8, wherein the MEMS devices comprise a first surface and a second surface, wherein the first surface is transmissive and where the second surface is reflective.

11. The system of claim 6, wherein the first visible light is a blue light, wherein the second visible light is a green light and wherein the third visible light is a red light.

12. The system of claim 6, wherein the first to third optical components are optically pumped lasers.

13. The system of claim 6, further comprising:
a display;
a special light modulator configured to modulate the light from the output toward the display; and
a controller configured to control the special light modulator.

14. An optical system comprising:
a first infrared laser light source;
a second infrared laser light source;
an optical switch optically connected to the first and second infrared laser light sources;
a first optical component configured to generate a first visible light;
a second optical component configured to generate a second visible light; and
a first semiconductor laser light source configured to generate a third visible light, where the first and second optical components are optically connected to the optical switch and to an output, and wherein the first semiconductor laser light source is connected to the output.

15. The system of claim 14, wherein the optical switch comprises a first optical switch connected to the first optical component and a second optical switch connected to the second optical component.

16. The system of claim 14, wherein the first and second optical switches are MEMS devices.

17. The system of claim 16, wherein the MEMS devices comprise a first surface and a second surface, wherein the first surface is transmissive and where the second surface is reflective.

18. The system of claim 14, wherein the first visible light is a blue light, wherein the second visible light is a green light and wherein the third visible light is a red light.

19. The system of claim 14, wherein the first and second optical components are optically pumped lasers.

20. The system of claim 14, further comprising:
a display;
a special light modulator configured to modulate the light from the output toward the display; and
a controller configured to control the special light modulator.

21. An optical system comprising:
a first infrared laser light source;
a second infrared laser light source;
an optical switch optically connected to the first and second infrared laser light sources;
a first optical component configured to generate a first visible light;
a second optical component configured to generate a second visible light; and
a third optical component configured to generate a third visible light, where the first to third optical components are optically connected to the optical switch, wherein the first to third optical components are optically connected to an output, and wherein the first to third optical components are optically pumped lasers.

* * * * *